No. 803,367. PATENTED OCT. 31, 1905.
C. G. & W. J. SHAW.
CUSHION TIRE.
APPLICATION FILED JULY 7, 1905.
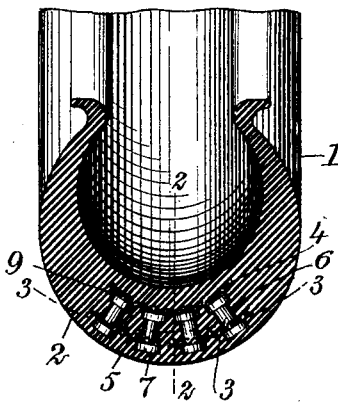
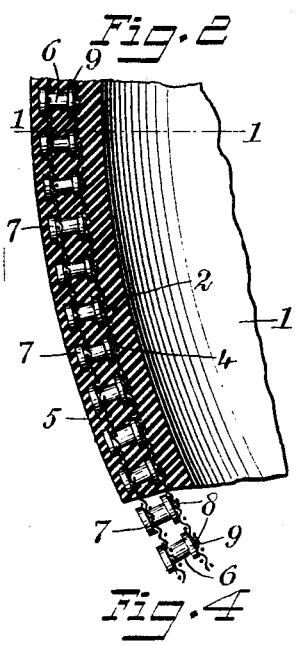
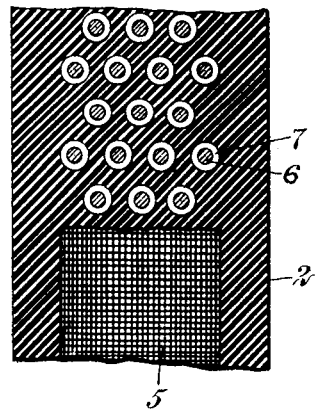
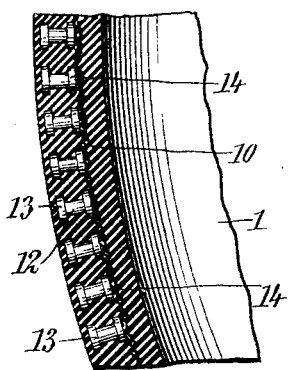
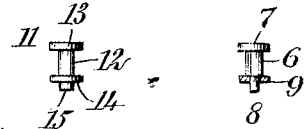
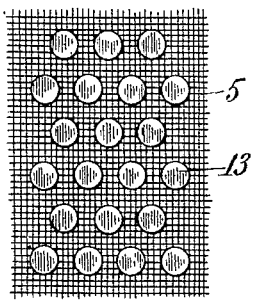
WITNESSES:
J. E. Davidson.
E. E. Ellis
INVENTORS
Carl G. Shaw
Webb J. Shaw
BY
ATTORNEYS

UNITED STATES PATENT OFFICE.

CARL GUARD SHAW AND WEBB J. SHAW, OF LOS ANGELES, CALIFORNIA.

CUSHION-TIRE.

No. 803,367.   Specification of Letters Patent.   Patented Oct. 31, 1905.

Application filed July 7, 1905. Serial No. 268,676.

*To all whom it may concern:*

Be it known that we, CARL GUARD SHAW and WEBB J. SHAW, citizens of the United States, and residents of Los Angeles, in the county of Los Angeles and State of California, have invented a new and Improved Cushion-Tire, of which the following is a full, clear, and exact description.

This invention relates to cushion-tires; and it consists, substantially, in the details of construction and combinations of parts hereinafter more particularly described, and pointed out in the claims.

The invention has reference more especially to tires for the wheels of automobiles, bicycles, and the like, though applicable to the wheels of other vehicles; and one of the principal objects thereof is to provide means for increasing the strength and wearing qualities of the tire generally, but more especially the tread or bearing portion thereof.

A further object is to overcome numerous disadvantages and objections frequently attending the use of many other means hitherto devised with like ends in view and also to provide means for the purposes stated which are of simple embodiment and the use of which when taking into account the increased advantages to be derived therefrom more than compensates for any comparative increase in the cost of manufacture of the tire equipped therewith.

The above and additional objects are attained by means substantially such as are illustrated in the accompanying drawings, forming a part of this specification, in which similar characters of reference indicate corresponding parts in all the views.

Figure 1 is a transverse sectional view of a cushion-tire having our improvements embodied in connection therewith, said view being substantially on the line 1 1 of Fig. 2. Fig. 2 is also a sectional view on the line 2 2 of Fig. 1. Fig. 3 is a sectional view taken substantially on the line 3 3 of Fig. 1. Fig. 4 is a sectional view also taken substantially on the line 2 2 of Fig. 1 and showing a modification of our improvements. Figs. 5 and 6 are detail views representing different forms of the rigid members which are embedded in the material of the tire; and Fig. 7 is also a view in detail, showing more clearly the relation between the rigid members and the strip or strips of reticulated material associated with said members.

Before proceeding with a more detailed description it may be stated that in the forms of our improvements herein shown we employ a pneumatic tire having its tread or bearing portion increased in thickness over the remaining portions thereof, and within such tread or bearing portion we employ special devices for effectually resisting rapid wear thereof without in any manner detracting from the cushioning or elastic qualities of the tire, and while we have herein represented our improvements in certain preferred embodiments it will be understood, of course, that we do not limit ourselves thereto in precise detail, since immaterial changes therein may be resorted to coming within the scope of our invention. It will be further understood that our improvements are adapted alike to pneumatic tires and solid-rubber tires and that the same are properly disposed or embedded within the material of the tire at the time of forming the latter within the mold therefor.

Reference being had to the drawings by the designating characters marked thereon, 1 represents an ordinary pneumatic tire, the tread or bearing portion 2 of which is of increased thickness over the remaining portions thereof, as shown in Fig. 1, and within such tread or bearing portion 2 are embedded a plurality of radially-disposed rigid members 3, which are connected throughout the circumference of the tire, preferably by duplicate parallel strips 4 and 5 of wire-gauze or other reticulated material. (See Figs. 1 and 2.) Said radially-disposed rigid members may be spaced any desired distance from each other, and they are preferably disposed about the tread or bearing portion of the tire in parallel rows, those of each row having staggered relation with those of the rows adjacent thereto circumferentially of the tire, and in the embodiment of our improvements (shown in Figs. 1 and 2) each of the radially-disposed rigid members 3 is constructed with a body portion 6, having integral therewith at one end a head 7 and at the other end a shank 8, removably fitted to which latter is another head 9. Previous to the molding of the tire the entire number of radially-disposed rigid members first have slipped upon the bodies thereof the circumferential strip 5 of wire-gauze or other recticulated material, (the heads 9 of the members having been previously removed,) whereupon the heads 9 of the members are applied to the shanks 8 thereof, and the other strip 4 of wire-gauze or other reticulated material is slipped over the projecting ends of said shanks, as indicated, said heads 7 and 9 of the radially-disposed rigid members thereby forming substantial bearing-surfaces for the reticulated strips 4 and 5 connecting the said members.

The strips 4 and 5 of wire-gauze or other reticulated material serve the purpose of holding the radially-disposed rigid members in desired position within the mold during the manufacture of the tire, and they also serve to prevent relative displacement of said members after the tire has been molded and hardened and otherwise completed for use, it being apparent that a tire equipped with our improved devices is capable of withstanding considerable wear without liability to cracking or puncturing of the tread or bearing surface thereof.

As shown in Fig. 4, we may dispense with one of the circumferential strips of wire-gauze or other reticulated material and employ a single strip 10 thereof only, in which case the said strip is preferably located at the inner extremities of the radially-disposed rigid members 11, (corresponding to the position of the strip 4 shown in Figs. 1 and 2,) each of the latter in this instance comprising a body portion 12 and heads 13 and 14 rigid therewith, together with a shank portion 15, projecting beyond the outer surface of the said head 14. We have found this form of our invention to be equally advantageous in practice as the other form referred to, and attention is called to the fact that in either construction herein shown the heads of the plurality of radially-disposed rigid members may be either round, octagonal, hexagonal, or any other desired shape in contour accordingly, as may be preferred in practice.

Having thus described our invention, we claim as new and desire to secure by Letters Patent—

1. A cushion-tire comprising numerous radially-disposed rigid members embedded therein at the tread portion thereof, and reticulated material connecting the members and embedded within the tire circumferentially thereof.

2. A cushion-tire comprising numerous radially-disposed rigid members embedded therein at the tread portion thereof, and reticulated material connecting the members and embedded within the tire circumferentially thereof, said members having heads forming bearings for such material.

3. A cushion-tire comprising rows of radially-disposed rigid members embedded therein at the tread portion thereof, those of each row alternating circumferentially with those of the rows adjacent thereto, and reticulated material connecting the members and embedded within the tire circumferentially thereof.

4. A cushion-tire comprising numerous radially-disposed rigid members embedded therein at the tread portion thereof, constructed of bodies having integral heads at one of their ends, and shanks at the other, provided with removable heads, and strips of reticulated material embedded within the tire circumferentially and connecting said bodies at the said shanks and integral heads thereof, as and for the purpose described.

In testimony whereof we have signed our names to this specification in the presence of two subscribing witnesses.

CARL GUARD SHAW.
WEBB J. SHAW.

Witnesses to the signature of Carl G. Shaw:
  T. C. NARAMORE,
  KATIE L. DYE.

Witnesses to the signature of Webb J. Shaw:
  W. L. DOOLEY,
  L. R. DYE.